(12) United States Patent
Bui et al.

(10) Patent No.: US 12,522,302 B2
(45) Date of Patent: Jan. 13, 2026

(54) CONNECTING DEVICE AND ROBOTIC TOOL

(71) Applicant: Globe (Jiangsu) Co., Ltd., Changzhou (CN)

(72) Inventors: Van Cuong Bui, Jönköping (SE); Wanghao Li, Changzhou (CN); Jin Cao, Changzhou (CN); Jie Gao, Changzhou (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 761 days.

(21) Appl. No.: 17/634,248

(22) PCT Filed: Aug. 12, 2020

(86) PCT No.: PCT/CN2020/108597
§ 371 (c)(1),
(2) Date: Feb. 10, 2022

(87) PCT Pub. No.: WO2021/027829
PCT Pub. Date: Feb. 18, 2021

(65) Prior Publication Data
US 2022/0332376 A1    Oct. 20, 2022

(30) Foreign Application Priority Data

Aug. 12, 2019   (CN) .......................... 201910738140.1

(51) Int. Cl.
*B62D 27/06*      (2006.01)
*A01D 34/00*      (2006.01)
(Continued)

(52) U.S. Cl.
CPC ........... *B62D 27/06* (2013.01); *A01D 34/008* (2013.01); *A01D 34/81* (2013.01); *A01D 34/82* (2013.01);
(Continued)

(58) Field of Classification Search
CPC ...... A01D 34/008; A01D 34/81; A01D 34/82; A01D 75/185; A01D 67/005;
(Continued)

(56) References Cited

U.S. PATENT DOCUMENTS

| 3,155,406 | A | * | 11/1964 | Gottschald | ............ | F16C 11/069 |
| | | | | | | 403/135 |
| 3,276,798 | A | * | 10/1966 | Merriman | ............. | F16C 11/069 |
| | | | | | | 403/77 |
| 3,524,664 | A | * | 8/1970 | Scheublein, Jr. | ... | F16C 11/0647 |
| | | | | | | 403/140 |
| 4,568,216 | A | * | 2/1986 | Mizusawa | ........... | F16C 11/0657 |
| | | | | | | 403/143 |

(Continued)

FOREIGN PATENT DOCUMENTS

| CN | 204784154 U | * | 11/2015 |
| CN | 106717559 A | | 5/2017 |
| EP | 0801238 A1 | | 10/1997 |

OTHER PUBLICATIONS

Chen et al. (CN 204784154 U)—English translation (Year: 2015).*

*Primary Examiner* — Joseph M Rocca
*Assistant Examiner* — Julia C Tran (57) ABSTRACT

The robotic tool includes a body (1), an upper cover (2) and a connecting device (3). The connecting device (3) includes a connecting seat fixed on the upper cover and a connecting rod (30) fixed on the body. The connecting seat includes a locking component (32), and the locking component is provided with a plurality of elastic connecting walls (323), and the elastic connecting walls (323) jointly define a sunken cavity (322) to house a connecting head of the connecting rod. When the locking component (32) is in a release position, the elastic connecting walls can be deformed outward to allow the connecting head to be removed from the sunken cavity. When the locking component is in a locking position, the elastic connecting walls are restricted from deforming outwards to keep the connecting head in the sunken cavity (322).

13 Claims, 5 Drawing Sheets

(51) Int. Cl.
*A01D 34/81* (2006.01)
*A01D 34/82* (2006.01)
*A01D 67/00* (2006.01)
*A01D 75/18* (2006.01)
*F16C 11/06* (2006.01)
*A01D 101/00* (2006.01)

(52) U.S. Cl.
CPC ........ *F16C 11/0671* (2013.01); *F16C 11/069* (2013.01); *A01D 75/185* (2013.01); *A01D 2101/00* (2013.01); *F16C 11/0638* (2013.01)

(58) Field of Classification Search
CPC .............. F16C 11/0671; F16C 11/0695; F16C 11/0638; F16C 11/069
See application file for complete search history.

(56) References Cited

U.S. PATENT DOCUMENTS

| | | | | |
|---|---|---|---|---|
| 5,885,022 | A * | 3/1999 | Maughan | F16C 11/0642 |
| | | | | 403/135 |
| 6,692,176 | B1 * | 2/2004 | Fladhammer | F16C 11/0695 |
| | | | | 403/135 |
| 11,131,337 | B1 * | 9/2021 | Miller | F16C 11/0604 |
| 2005/0008429 | A1 * | 1/2005 | Melis | F16C 11/0638 |
| | | | | 403/27 |
| 2008/0056843 | A1 * | 3/2008 | Klingenberg | F16B 19/109 |
| | | | | 411/347 |
| 2015/0071730 | A1 * | 3/2015 | Tseng | F16B 5/0208 |
| | | | | 411/318 |
| 2017/0184148 | A1 * | 6/2017 | Sasaki | F16B 7/0406 |
| 2017/0314611 | A1 * | 11/2017 | Sundberg | F16C 11/0638 |
| 2019/0310641 | A1 * | 10/2019 | Matsuzawa | G05D 1/02 |
| 2020/0000028 | A1 * | 1/2020 | Matsuzawa | A01D 34/008 |

* cited by examiner

CONNECTING DEVICE AND ROBOTIC TOOL

TECHNICAL FIELD

The disclosure relates to a connecting device and a robotic tool using the same.

BACKGROUND

Robotic tools have been widely used in people's lives, such as robotic mowers. A robotic mower known to the inventor includes a body and an upper cover. Driving wheels and driven wheels are mounted on the body, a control circuit is mounted inside the body, the upper cover is mounted above the body and may move relative to the body, and a movable connecting device is connected between the upper cover and the body. A displacement sensor for collision detection is further arranged between the body and the upper cover. When the robotic mower is moving, if the upper cover collides with an obstacle, the upper cover will move relative to the body. The displacement sensor is configured to send a signal to the control circuit to control the robotic mower to move in reverse or sideways.

In order to achieve 360° omnidirectional collision detection, it is required that the movable connecting device may realize free movement in all directions on a plane and the force in all directions is consistent. Therefore, the movable connecting device is mostly a universal joint assembly with a connecting head. The upper cover is provided with a spherical groove, and the connecting head is movably connected with the spherical groove.

During use, the upper cover sometimes needs to be removed due to other reasons such as cleaning or repairing. If a deformation force between the spherical groove and the connecting head is too large, it will take a lot of effort to remove the upper cover from the body, and a mounting after removal is also laborious. If the deformation force between the spherical groove and the connecting head is too small, it is easy to fall off. In addition, the connecting head is located below the upper cover and it is not convenient to observe. Consumers may not mount the upper cover properly during mounting, which may cause the body to fall off when consumers lift the mower.

Therefore, it is necessary to improve conventional connecting devices and robotic tools.

SUMMARY

The disclosure provides a connecting device. The connecting device is provided with a locking component. The locking component may be arranged in a release position or a locking position as needed.

The disclosure further provides a robotic tool. The robotic tool is provided with an upper cover, a body and a connecting device connecting the upper cover and the body. The locking component of the connecting device has a release position and a locking position, so the upper cover can be easily removed and also be reliably held on the body.

Specifically, this disclosure is implemented through the following technical solutions: a connecting device is provided, the connecting device includes a connecting seat and a connecting rod. A top of the connecting rod is provided with a connecting head. The connecting seat includes a locking component, the locking component is provided with a plurality of elastic connecting walls, and the plurality of elastic connecting walls jointly define a sunken cavity for housing the connecting head. When the locking component is in the release position, the elastic connecting walls can be deformed outwards to allow the connecting head to be removed from the sunken cavity. When the locking component is in the locking position, the elastic connecting walls are restricted from deforming outward to keep the connecting head in the sunken cavity.

The locking component of the connecting device of the disclosure has a release position and a locking position. The connecting seat and the connecting rod may be separated in the release position, and the connection of the connecting seat and the connecting rod may be maintained at the locking position, so as to meet different usage requirements.

The disclosure further provides the following technical solutions: a robotic tool is provided, the robotic tool includes a body and an upper cover. The robotic tool further includes the connecting device mentioned above, wherein the connecting seat is fixed on the upper cover and the locking component is exposed from the upper cover. The connecting rod is fixed on the body.

When the robotic mower of the disclosure is in normal use, the locking component is in the locking position to prevent the upper cover from separating from the body. When consumers need to remove the upper cover, they may move the locking component to the release position to easily remove the upper cover.

It should be understood that the above general description and the following detailed description are only exemplary and explanatory, and cannot limit the disclosure.

PART NUMBER DESCRIPTION body—1, traveling wheel—11, control area—12, upper cover—2, opening—20, connecting device—3, mounting base—31, cavity—310, top wall—311, annular side wall—312, through hole—313, mounting column—314, protruding rib—315, positioning groove—316, indicator mark—317, locking component—32, annular cavity—320, internal thread—321, sunken cavity—322, elastic connecting wall—323, gap—A, column—324, operating part—325, groove—326, positioning component—327, protruding part—328, bottom surface—S, bottom plate—33, protruding column—331, external thread—332, adjustment cavity—333, bottom wall—334, mounting hole—335, upper inner wall—336, lower inner wall—337, stop step—338, connecting rod—30, connecting head—300, screw—35.

DETAILED DESCRIPTION

The exemplary embodiments will be described in detail here and shown in drawings. When the following description refers to the drawings, unless otherwise indicated, the same numbers in different drawings indicate the same or similar elements. The implementation manners described in the following exemplary embodiments do not represent all implementation manners consistent with the disclosure. On the contrary, they are merely examples of devices, systems, equipments and methods consistent with some aspects of the disclosure as detailed in the claims.

The disclosure provides a robotic tool. The robotic tool may be a robotic mower, a robotic vacuum cleaner and so on. In this embodiment, a robotic mower is taken as an example. Please refer to FIG. 1, the robotic mower mainly includes a body 1 and an upper cover 2. Traveling wheels are mounted on the body 1. A control circuit is mounted inside the body 1, and a control area 12 is arranged on a top of the body 1. The upper cover 2 is mounted above the body 1. A contour of the upper cover 2 is larger than a contour of the body 1, and an opening 20 is arranged to expose the control area 12 to facilitate consumers to control the robotic mower. A collision detection component is also arranged between the upper cover 2 and the body 1, such as a displacement sensor including a Hall sensor and a magnet. When a collision occurs, the upper cover 2 and the body 1 move relative to each other, a change in the relative position of the magnet and the Hall sensor leads to a change in a magnetic field. The Hall sensor senses the change in the magnetic field and outputs a signal to the control circuit to control the robotic mower to change a moving direction to avoid collisions.

Figure 1:
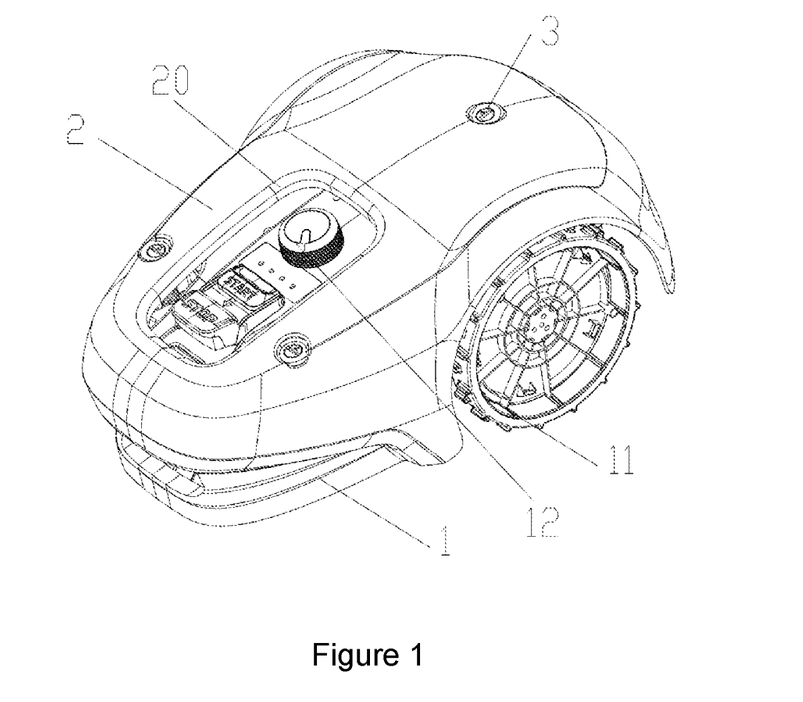
FIG. 1 is a perspective view of a robotic mower according to an embodiment of the disclosure.

The disclosure further provides a connecting device. In this embodiment, a plurality of connecting devices 3 are movably connected between the upper cover 2 and the body 1 of the robotic mower to allow the upper cover 2 to be displaced relative to the body 1. As an embodiment of the disclosure, there are three connection devices. Two of them are located at a rear of the robotic mower and one is located at a front of the robotic mower. The connecting device 3 of the disclosure is improved on a basis of a conventional art and has different positions and states, which may not only easily remove the upper cover but also avoid the problem that the upper cover is easy to fall off.

Figure 2:
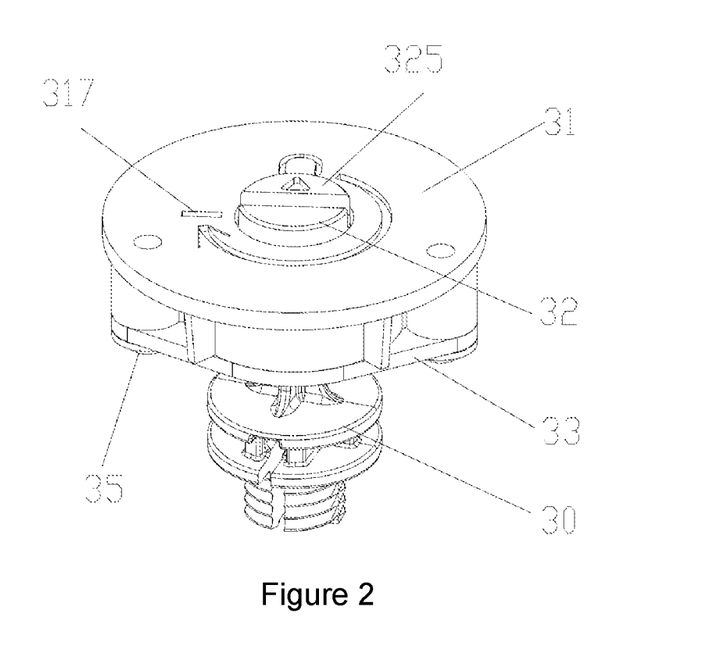
FIG. 2 is a perspective view of a connecting device of a robotic mower according to an embodiment of the disclosure.

Please refer to FIG. 2, the connecting device 3 of the embodiment includes a connecting rod 30 and a connecting seat. The connecting rod 30 is fixed on the body 1. The connecting seat is fixed on the upper cover 2. The connecting rod 30 is provided with a connecting head 300 and the connecting head 300 is movably arranged in the connecting seat to realize a movable connection between the body 1 and the upper cover 2. The connecting seat includes a mounting base 31, a locking component 32 and a bottom plate 33. The bottom plate 33 is located on a bottom side of the mounting base 31, and the locking component 32 is located between the mounting base 31 and the bottom plate 33.

Figure 3:
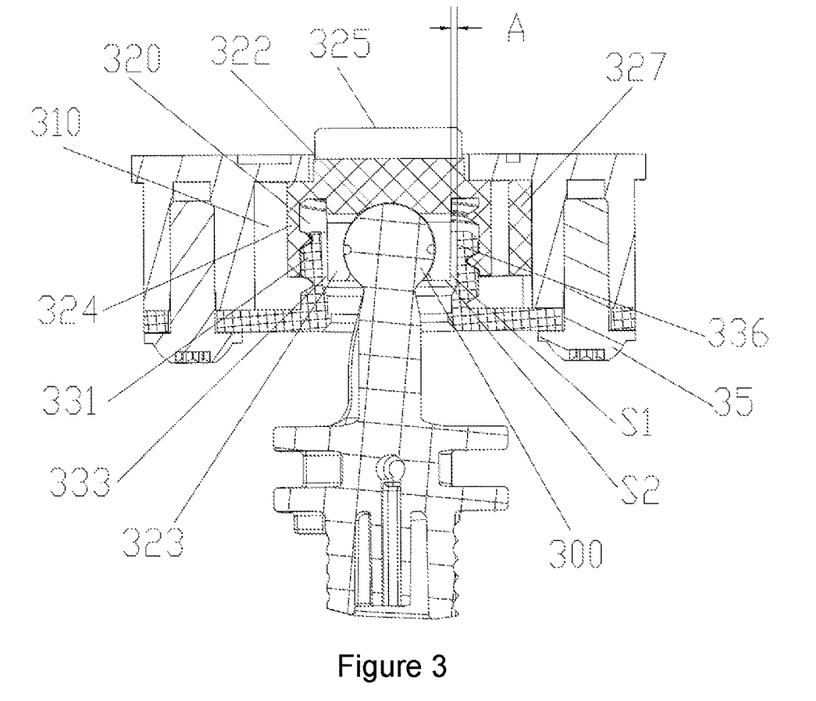
FIG. 3 is a cross-sectional view of the connecting device in FIG. 2, in which a locking component of the connecting device is in a release position.
Figure 4:
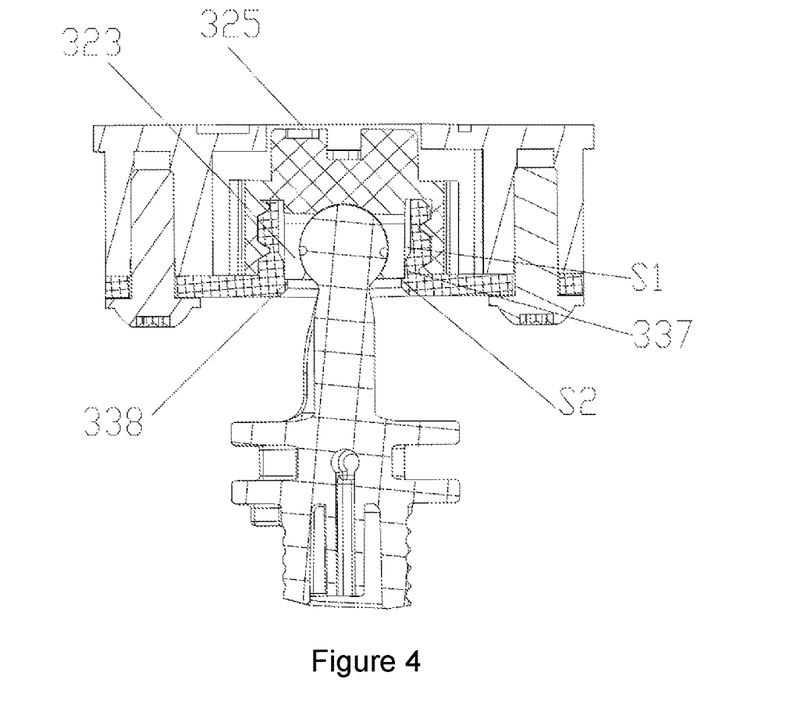
FIG. 4 is similar to FIG. 3, but the locking component is in a locking position.

Please refer to FIG. 3 and FIG. 4, a cavity 310 is arranged inside the mounting base 31, the locking component 32 is housed in the cavity 310, and a top of the locking component 32 is exposed for consumers' operation. The locking component 32 is provided with an annular cavity 320, and an inner wall surface of the annular cavity 320 is provided with an internal thread 321. The locking component 32 is further provided with a sunken cavity 322 located in the annular cavity 320. A plurality of elastic connecting walls 323 defines the sunken cavity 322 collectively. The elastic connecting wall 323 has a certain degree of elasticity and can be deformed appropriately to allow the connecting head 300 in the sunken cavity 322 to be removed from the sunken cavity 322. In an embodiment, the connecting head 300 is spherical, and the sunken cavity 322 is a spherical cavity.

The bottom plate 33 is fixed on the mounting base 31 and is provided with a protruding column 331. An outer side of the protruding column 331 is provided with an external thread 332 which can be threadedly connected with the internal thread 321 of the annular cavity 320. The protruding column 331 is a hollow structure, and an adjustment cavity 333 penetrating up and down is defined inside it. The locking component 32 and the bottom plate 33 are both assembled from a bottom side of the mounting base 31, the locking component 32 and the bottom plate 33 may be threadedly connected with each other, and then assembled on the mounting bases 31 together. After assembly, the annular cavity 320 of the locking component 32 is located in the cavity 310, and the protrusion column 331 of the bottom plate 33 extends into the annular cavity 320. The external thread 332 of the protrusion column is matched with the internal thread 321 of the annular cavity 320, and the sunken cavity 322 of the locking component 32 is further located in the adjustment cavity 333 of the protruding column 331. The connecting head 300 of the connecting rod 30 passes through the bottom plate 33 and is movably housed in the sunken cavity 322.

In this embodiment, the bottom plate 33 is locked and fixed at a bottom side of the mounting base 31 by screws 35, and its position relative to the mounting base 31 remains unchanged. The threaded connection between the locking component 32 and the bottom plate 33 enables the locking component 32 to move up and down while rotating, which drives its elastic connecting walls 323 to move up and down in the adjustment cavity 333. The adjustment cavity 333 is generally cylindrical with a stepped inner wall and a smaller diameter near the bottom. Please refer to FIG. 3, when the elastic connecting walls 323 are located at a high position, there is a gap A between an inner wall surface of the adjustment cavity 333 and an outside surface S1 of the elastic connecting wall 323, which allows the elastic connecting walls 323 to deform outwards so as to enable the connecting head 300 to be separated from the sunken cavity 322 and then to be separated from the upper cover 2, so that the upper cover 2 can be separated from the body 1. When the elastic connecting walls 323 are located at a low position, the inner wall surface of the adjustment cavity 333 restricts an outward deformation of the elastic connecting walls 323, thereby restricting the connecting head 300 in the sunken cavity 322 and keeping the upper cover 2 being connected with the body 1.

Please note that restriction can be that the inner wall surface of the adjustment cavity 333 abuts the elastic connecting wall 323, or the inner wall surface of the adjustment cavity 333 is very close to the elastic connecting wall 323. Although the elastic connecting wall 323 can be slightly expanded and deformed outward, degree of deformation thereof is insufficient to enable the connecting head 300 to be removed from the sunken cavity 322.

Correspondingly, it is defined that the locking component 32 has a release position and a locking position. When the locking component 32 is at the release position, the elastic connecting wall 323 can expand and deform outward, which allows the connecting head 300 to be removed from the sunken cavity 322, so that the connecting seat and the connecting rod 30 may be separated. When the locking component 32 is at the locking position, the elastic connecting wall 323 is restricted by the inner wall surface of the adjustment cavity 333 and cannot expand and deform enough, so that the connecting head 300 is confined in the sunken cavity 322, which maintains a connection relationship between the connecting seat and the connecting rod 30. Therefore, the release position and the locking position of the locking component 32 may meet different usage requirements of the connecting device 3.

When the robotic mower with the connecting device 3 is in normal use, the locking component 32 is at the locking position. Since the connecting head 300 is restricted in the sunken cavity 322, even if the upper cover 2 is lifted when the robotic mower is being transported, it will not cause the upper cover 2 to be separated from the body 1. When a consumer needs to remove the upper cover 2 for cleaning or maintenance, the locking component 32 may be rotated to the release position, and the upper cover 2 may be lifted up to easily remove the upper cover 2. After cleaning or maintenance, the upper cover 2 is placed on the body 1, the connecting head 300 is inserted into the sunken cavity 322, the locking component 32 is rotated from the released position to the locking position, and then the robotic mower may continue to work normally.

In this embodiment, the bottom plate 33 may not be moved up and down, and the locking component 32 can be moved up and down when it rotates. As a simple alternative, the locking component 32 may also be set to be unable to be moved up and down. Instead, when the locking component 32 is rotated, the bottom plate 33 is driven to be moved up and down, and other structures may remain unchanged. When the locking component 32 is at the release position, the bottom plate 33 is at a high position, and the connecting head 300 may be separated from the sunken cavity 322. When the locking component 32 is at the locking position, the bottom plate 33 is at a low position, and the connecting head 300 is restricted in the sunken cavity 322.

In this embodiment, when the locking component 32 is at the release position, an existence of the gap A between the inner wall surface of the adjustment cavity 333 and the outside surface S1 of the elastic connecting wall 323 enables the elastic connecting wall 323 to expand outward. As a simple alternative, the gap A may not exist, which means that when the locking component 32 is at the release position, the elastic connecting wall 323 is located outside the adjustment cavity 333. Therefore, the elastic connecting wall 323 can expand outward without restriction. The prerequisite of this embodiment is that it still needs to ensure that a threaded connection between the locking component 32 and the bottom plate 33 may produce a sufficient amount of up and down displacement.

Please refer to FIG. 2 in conjunction with FIG. 5 through FIG. 10, specific structures of the mounting base 31, the bottom plate 33 and the locking component 32 are described in detail.

In this embodiment, the bottom plate 33 is fixed relative to the mounting base 31, and the bottom plate 33 and the mounting base 31 are two assembled parts. As a simple alternative, the bottom plate 33 may also be manufactured integrally with the mounting base 31 or separately manufactured and then riveted into an integral structure. The locking component 32 is movably arranged relative to the mounting base 31, which may rotate and move up and down. In the following, it will be described by taking the base plate 33 and the mounting seat 31 separately arranged as an example.

Figure 5:
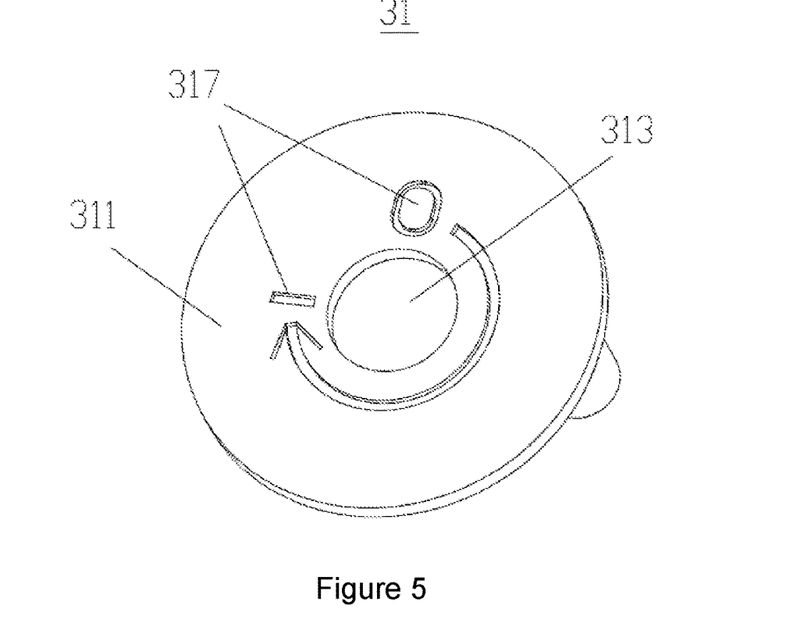
FIG. 5 is a perspective view of a mounting base of the connecting device.
Figure 6:
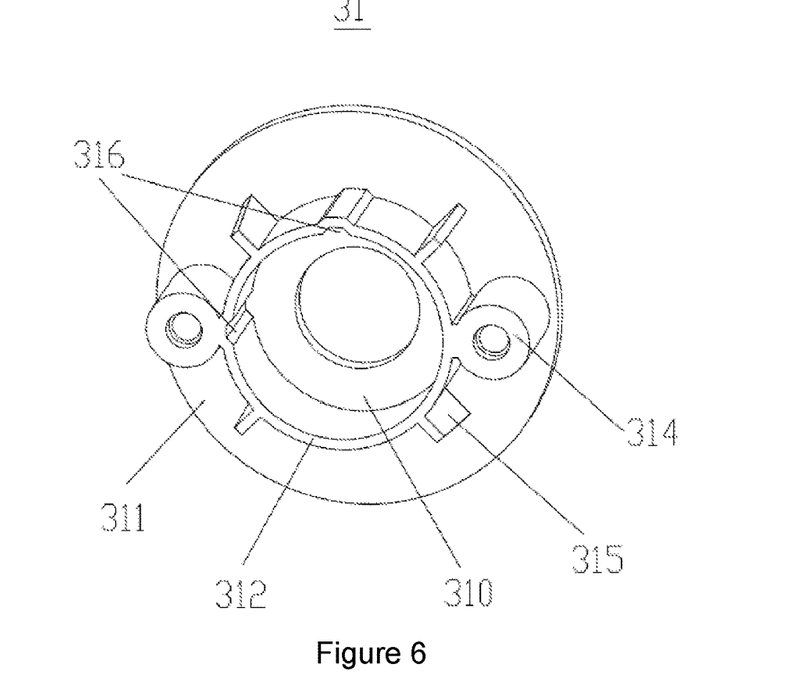
FIG. 6 is another perspective view of the mounting base, which shows a bottom structure of the mounting base.

FIG. 5 and FIG. 6 are perspective views of the mounting base 31. The mounting base 31 includes a top wall 311 and an annular side wall 312 extending downward from a middle of the top wall 311. The annular side wall 312 and the top wall 311 together define the cavity 310 mentioned above. The bottom plate 33 is mounted on a bottom surface of the annular side wall 312, and the locking component 32 is housed in the cavity 310. The top wall 311 is substantially circular, and a through hole 313 is arranged at a center of the top wall 311 for partially exposing the locking component 32. A pair of mounting columns 314 is further arranged on a lower side of the top wall 311 and they are respectively located at opposite ends of the cavity 310 for fixing screws 35 to mount the bottom plate 33 to a bottom surface of the mounting base 31. The annular side wall 312 is further provided with a plurality of protruding ribs 315 connected with the top wall 311 to improve the strength of the annular side wall 312.

Figure 7:
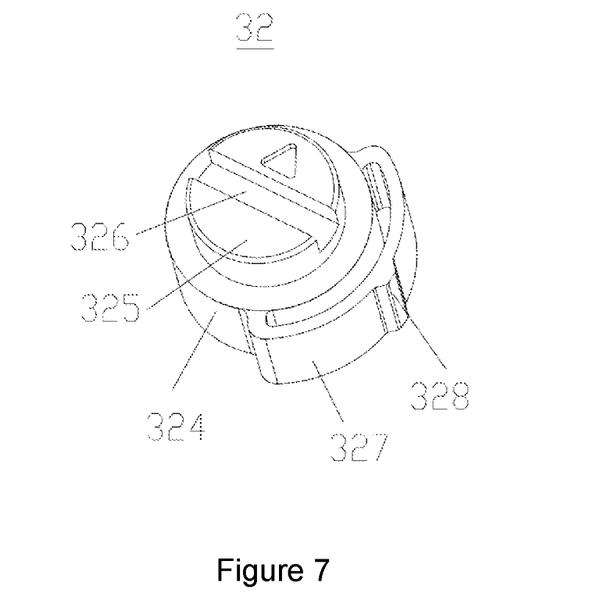
FIG. 7 is a perspective view of a locking component of the connecting device.
Figure 8:
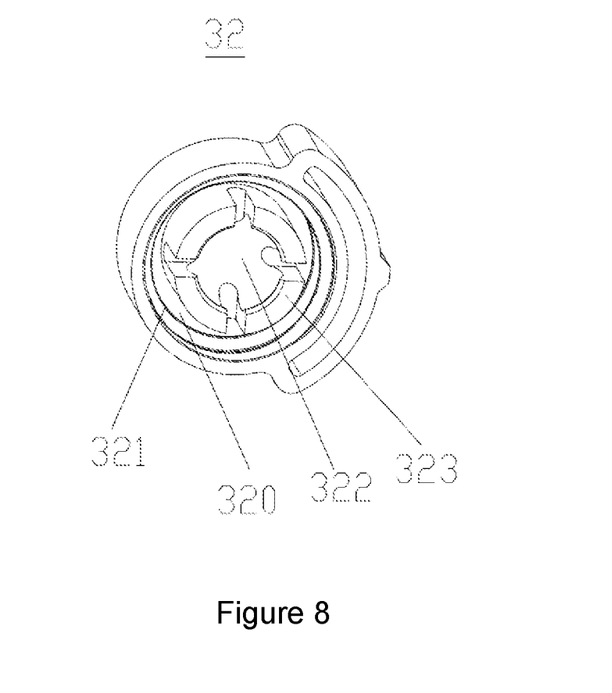
FIG. 8 is another perspective view of the locking component, which shows a bottom structure of the locking component.

FIG. 7 and FIG. 8 are perspective views of the locking component 32. The locking component 32 includes a column 324 and an operating part 325 on a top of the column 324. The column 324 is approximately cylindrical with a bottom opening. The operating part 325 is also cylindrical and located at a center of the top of the column 324. A diameter of the operating part 325 is smaller than a diameter of the column 324. As shown in FIG. 5, a diameter of the through hole 313 of the top wall 311 of the mounting base 31 is larger than the diameter of the operating part 325, but smaller than the diameter of the column 324, so the operating part 325 can protrude into the through hole 313 and expose outside of the mounting base 31. The upper cover 2 is further provided with a hole (not labeled) to expose the operating part 325 for consumers to operate. The column 324 is restricted below the through hole 313. A top of the operating part 325 is further provided with a groove 326. When an operator needs to rotate the locking component 32, a screwdriver or other tools may be used to snap into the groove 326 to drive the locking component 32.

The annular cavity 320 with the internal thread 321 mentioned above is defined in the column 324. The column 324 is also provided with the elastic connecting wall 323 and the sunken cavity 322 defined by the connecting wall 323. A center line of the sunken cavity 322 overlaps a center line of the operating part 325. When the operating part 325 is rotated, the sunken cavity 322 will not move eccentrically. In this embodiment, there are four elastic connecting walls 323, and there are gaps between adjacent elastic connecting walls 323, so that the connecting walls 323 have elasticity and can deform outwardly.

The locking component 32 further includes a positioning component 327 on a side of the column 324. The positioning component 327 is roughly arc-shaped surrounding the column 324 and defines a gap with the column 324. One end of the positioning component 327 is connected with the column 324, so the positioning component 327 has certain elasticity and may be deformed appropriately. A protruding part 328 is arranged on an outside surface of the positioning component 327. As shown in FIG. 5, an inner wall surface of the cavity 310 is further provided with two vertical positioning grooves 316 arranged at intervals. When the locking component 32 rotates in the cavity 310, the positioning component 327 drives the protruding part 328 to rotate, and the protruding part 328 is respectively engaged with the corresponding positioning groove 316 at the aforementioned release position or the locking position. An engaging force of the positioning groove 316 of the positioning component 327 may prevent the locking component 32 from rotating and moving by itself when a consumer is not operating. At the same time, it is also convenient for consumers to obtain a clear reminder of whether the locking component 32 is rotated in place during operation.

As an embodiment, a top surface of the top wall 311 is provided with an indicator mark 317 around the through hole 313, which may further remind consumers whether the locking component 32 has been rotated in place. The indicator mark 317 includes "0" and "1". As shown in FIG. 2, the top of the operating part 325 of the locking component 32 is provided with an arrow, and the arrow is used in conjunction with the indicator mark 317. In this embodiment, the arrow pointing to "0" indicates that the locking component 32 is at the release position, and the arrow pointing to "1" indicates that the locking component 32 is at the locking position. In order to prevent misoperation, a direction arrow indicating a direction of rotation of the locking component 32 may also be arranged between "0" and "1". When the locking component 32 rotates to "0" or "1", the protruding part 328 is engaged with the positioning groove 316. As a simple replacement, "0" and "1" may also be represented by other text or graphics, such as "release" or "lock", "separate" or "connect", lock and unlock icons, etc., which is not limited specifically here.

Figure 9:
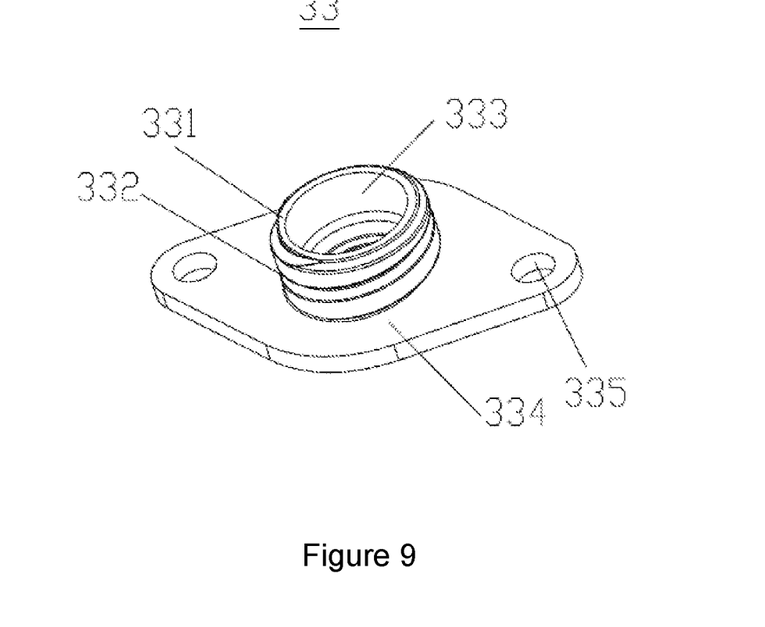
FIG. 9 is a perspective view of a bottom plate of the connecting device.

FIG. 9 is a perspective view of the bottom plate 33. The bottom plate 33 is provided with a bottom wall 334 and the protruding column 331 extending upward from a middle of the bottom wall 334. The bottom wall 334 is substantially rhombus, and two opposite corners are provided with mounting holes 335. The screws 35 pass through the mounting holes 335 and are fixed to the mounting columns 314 of the mounting base 31 to fix the bottom plate 33 on the mounting base 31.

Figure 10:
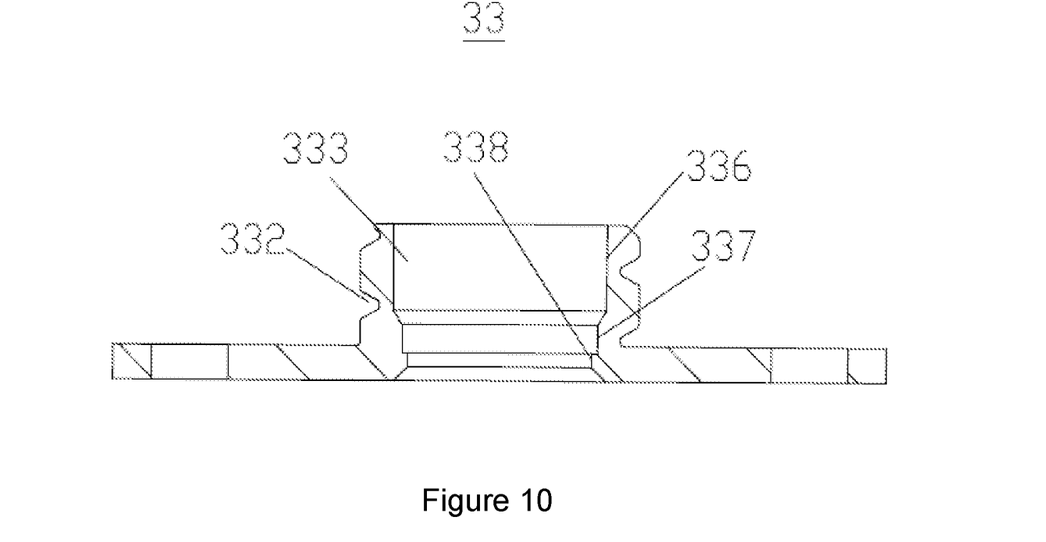
FIG. 10 is a cross-sectional view of the bottom plate.

FIG. 10 is a cross-sectional view of the bottom plate 33. An inner side wall of the adjustment cavity 333 is provided with a step, so that different height positions of the adjustment cavity 333 have different inner diameters. The inner wall of the adjustment cavity 333 is divided into an upper inner wall 336 and a lower inner wall 337 by the step. The step is located between the upper inner wall 336 and lower inner wall 337 and is a chamfer.

Outer surfaces of the elastic connecting walls 323 are located on a circle, and a diameter of the circle is defined as an outer diameter of the elastic connecting walls 323. An inner diameter of the upper inner wall 336 is greater than the outer diameter of the elastic connecting wall 323, and an inner diameter of the lower inner wall 337 is equal to the outer diameter of the elastic connecting wall 323. Please note that "equal to" here means roughly equal, which means that a size difference between an inner diameter of the lower inner wall 337 and the outer diameter of the elastic connecting wall 323 is not enough to allow the elastic connecting wall 323 to deform enough to enable the connecting head 300 to be removed from the sunken cavity 322. Therefore, when the elastic connecting wall 323 is aligned with the upper inner wall 336 and the lower inner wall 337 is staggered up and down, the elastic connecting wall 323 may be deformed outward, corresponding to the release position of the locking component 32. When the elastic connecting wall 323 is at least partially aligned with the lower inner wall 337, the elastic connecting wall 323 is restricted from deforming outward, corresponding to the locking position of the locking component 32.

The adjustment cavity 333 is further provided with another ring of stop steps 338 below the lower inner wall 337. An inner diameter of the stop steps 338 is smaller than the outer diameter of the elastic connecting wall 323. When the locking component 32 is at the locking position, which means when the elastic connecting wall 323 is at a low position, a bottom surface S2 of the elastic connecting wall 323 resists with the stop step 338, and the stop step 338 is used for stopping.

Please return to FIG. 2, when the upper cover 2 is mounted on the body 1, the operating part 325 of the locking component 32 is located in the through hole 313 of the mounting base 31, and the arrow on the operating part 325 points to "0" of the mounting base 31. At this time, the locking component 32 is at the release position. Please refer to FIG. 3, the connecting head 300 may be easily inserted into the sunken cavity 322 defined by the elastic connecting wall 323 at this time, and the connecting device 3 is movably connected with the body 1 and the upper cover 2. Then the operating part 325 is rotated by a tool to rotate the locking component 32 until the arrow on the operating part 325 points to "1", which indicates that the rotation is in place. The locking component 32 moves down to the locking position while rotating. Please refer to FIG. 4, the connecting head 300 is kept in the sunken cavity 322 at this time, which may prevent the upper cover 2 from being easily separated from the body 1.

When the robotic mower is in normal use, the locking component 32 is at the locking position to prevent the upper cover 2 from being separated from the body 1. When the upper cover 2 needs to be removed for cleaning or maintenance, the locking component 32 is rotated in the reverse direction to move from the locking position to the release position, so that the connecting head 300 may be easily separated from the sunken cavity 322, and then the upper cover 2 can be removed simply and conveniently.

The terminology used in this disclosure is only for describing specific embodiments, and is not intended to limit the application. The singular forms of "a" and "the" used in this disclosure and the claims are also intended to include plural forms, unless the context clearly indicates other meanings. It should also be understood that the term "and/or" as used herein refers to and includes any or all possible combinations of one or more associated listed items.

Terms such as "upper", "lower", "left", "right", "front", "rear", "thickness", "radial", "axial" and other terms indicating relative positions in space are used to describe the relationship of one feature to another feature as shown in the drawings for facilitating explanation, and is not limited to one position or one spatial direction. It can be understood that, according to different product positions, the terms of relative positions in space may be intended to include different positions other than those shown in the figures, and should not be understood as limiting the claims. In addition, the descriptive word "horizontal" used herein is not completely equivalent to being along a direction perpendicular to gravity, which allows a certain angle of inclination.

"Including" or "comprising" and other similar words mean that the components or items before "including" or "comprising" have the components or items listed after "including" or "comprising" and their equivalents, and do not exclude other components or items.

It should be noted that when a component is described as "fixed to . . ." another component, it may be directly on the surface of another component, or it may be at a distance from the surface of another component. The terms "mounted", "connected", "fixed" and other terms should be understood in a broad sense, for example, it may be a fixed connection, a detachable connection, or a whole. It may be a mechanical connection, an electrical connection or communicate with each other. It may be a direct connection or an indirect connection through an intermediate medium, and it may be an internal communication between two components or an interaction relationship between the two components, unless it is specifically defined otherwise.

In the disclosure, unless specifically stipulated and defined otherwise, the first feature being "on" or "under" the second feature may be a direct contact between the first feature and second feature, or an indirect contact between the first feature and second feature through an intermediary. Moreover, the first feature being "on" and "above" the second feature may mean that the first feature is directly above or obliquely above the second feature, or it simply means that the level of the first feature is higher than that of the second feature. The first feature being "under" and "below" the second feature may mean that the first feature is directly below or obliquely below the second feature, or it simply means that the level of the first feature is lower than that of the second feature.

It should be understood that the "first", "second" and similar words used in the specification and claims of this disclosure do not indicate any order, quantity or importance, but are only used to distinguish different components. "Multiple" or "several" and the like mean two or more than two.

The above are only preferred embodiments of this disclosure, and are not intended to limit this disclosure. Any modification, equivalent replacement, improvement, etc. within the spirit and principle of this disclosure shall be included in the scope of protection of this disclosure.

What is claimed is:

1. A connecting device, comprising
a connecting seat, and
a connecting rod (30), a top of the connecting rod (30) being provided with a connecting head (300), wherein the connecting seat comprises a locking component (32), the locking component (32) is provided with a column (324), a plurality of elastic connecting walls (323) located in the column (324), there are gaps between adjacent elastic connecting walls (323), so that the elastic connecting walls (323) have elasticity and are capable of deforming outwardly, an annular cavity (320) located between the column (324) and the plurality of elastic connecting walls (323), an inner wall of the column (324) is provided with an internal thread (321), the plurality of elastic connecting walls (323) jointly defines a sunken cavity (322) to house the connecting head; when the locking component (32) is in a release position, the elastic connecting walls (323) is outwardly deformable to allow the connecting head (300) to be removed from the sunken cavity (322); when the locking component (32) is in a locking position, the elastic connecting wall (323) is capable of being slightly expanded and deformed outward but insufficient to enable the connecting head (300) to be removed from the sunken cavity (322), so the elastic connecting walls (323) are restricted from deforming outwards to keep the connecting head (300) in the sunken cavity (322) and in the locking position the connecting head (300) is movably arranged in the connecting seat to allow the connecting seat to be displaced relative to connecting rod (30) in all directions which is detectable by a collision detection component;

wherein, the connecting head (300) is spherical, and the sunken cavity (322) is a spherical cavity, the plurality elastic connecting (323) walls of the sunken cavity (322) is in a surface contact with the connecting head (300) in the locking position;

wherein, the connecting seat comprises a bottom plate (33), the bottom plate (33) is provided with a protruding column (331) and an adjustment cavity (333), the adjustment cavity (333) is defined in the protruding column (331), an external thread (332) coupled with the internal thread (321) is arranged on an outer surface of the protruding column (331), the external thread (332) of the protruding column extends into the annular cavity (320) and is connected with the internal thread (321) of the column (324), so that the locking component (32) moves up and down relative to the bottom plate (33) when the locking component (32) rotates, wherein, there is a gap between an inner wall surface of the adjustment cavity (333) and an outside surface of the elastic connecting wall (323) which allows the elastic connecting walls (323) to deform outwards so as to enable the connecting head (300) to be separated from the sunken cavity (322).

2. The connecting device according to claim 1, wherein the connecting head passes through the bottom plate (33) and is housed in the sunken cavity (322), when the locking component (32) is in the locking position, the elastic connecting walls are located inside the adjustment cavity (333), and the adjustment cavity (333) limits an outward deformation of the elastic connecting walls (323).

3. The connecting device according to claim 2, wherein the adjustment cavity (333) is provided with an upper inner wall (336) and a lower inner wall (337), an outer diameter of the elastic connecting wall (323) is smaller than an inner diameter of the upper inner wall (336) and equals to an inner diameter of the lower inner wall (337), the locking component (32) is capable of moving up and down relative to the bottom plate (33), when the locking component (32) is in the release position, the elastic connecting walls (323) are aligned with the upper inner wall (336) and staggered with the lower inner wall (337), when the locking component (32) is in the locking position, the elastic connecting walls (323) are at least partially aligned with the lower inner wall (337).

4. The connecting device according to claim 3, wherein the adjustment cavity (333) is further provided with a stop step (338) below the lower inner wall (337), when the locking component (32) is in the locking position, a bottom surface of the elastic connecting wall (323) abuts against the stop step (338).

5. The connecting device according to claim 2, wherein the connecting device (3) further comprises a mounting base (31), the mounting base (31) comprises a top wall (311) and an annular side wall (312) extending downward from the top wall (311), the annular side wall (312) and the top wall (311) jointly define a cavity (310), the bottom plate (33) is mounted on a bottom surface of the annular side wall (312), and the locking component (32) is housed in the cavity (310).

6. The connecting device according to claim 5, wherein the bottom plate (33) is fixed to the mounting base (31) by screws, or the bottom plate (33) and the mounting base (31) are integrally arranged.

7. The connecting device according to claim 5, wherein the locking component (32) further comprises a positioning component (327), a protruding part (328) is arranged on an outer side wall of the positioning component (327), an inner wall of the cavity (310) is provided with two positioning grooves (316), when the locking component (32) is located in the release position or the locking position, the protruding part (328) is respectively engaged with the corresponding positioning groove (316).

8. The connecting device according to claim 5, wherein the locking component (32) comprises an operating part (325) located on a top of the column (324), the column (324) is located in the cavity (310), the top wall of the mounting base (31) is provided with a through hole (313), and the operating part (325) is exposed from the through hole (313).

9. The connecting device according to claim 8, wherein the operating part (325) comprises a groove (326), the groove (326) is located on a top of the operating part (325), when the locking component (32) is to be rotated, a screwdriver or other tool is capable of being inserted into the groove (326) to rotate.

10. The connecting device according to claim 8, wherein the mounting base (31) is further provided with an indicator mark (317) around the through hole (313), the operating part (325) is correspondingly provided with an arrow, when the locking component (32) is respectively located in the release position and/or the locking position, the arrow points to the indication mark (317).

11. The connecting device according to claim 1, wherein a bottom of the locking component (32) extends downwardly to form two layers of annular walls, the two layers of annular walls is concentrically disposed, a gap between the two layers of annular walls being the annular cavity (320), a first layer of the annular walls located outside is the column (324) having the internal thread (321) provided on an inner wall surface of the column (324), and a second layer of the annular walls located inside the first layer is the elastic connecting walls (323) having a spherical wall on an inner wall surface of the elastic connecting walls (323) to define the sunken cavity (322).

12. A robotic tool, comprising a body (1) and an upper cover (2), wherein
the robotic tool further comprises a connecting device (3), the connecting device (3) comprising
a connecting seat, and
a connecting rod (30), a top of the connecting rod (30) being provided with a connecting head (300); wherein
the connecting seat comprises a locking component (32), the locking component (32) is provided with a column (324), a plurality of elastic connecting walls (323) located in the column (324), there are gaps between adjacent elastic connecting walls (323), so that the elastic connecting walls (323) have elasticity and are capable of deforming outwardly, an annular cavity (320) located between the column (324) and the plurality of elastic connecting walls (323), an inner wall of the column (324) is provided with an internal thread (321), the plurality of elastic connecting walls (323) jointly defines a sunken cavity (322) to house the connecting head; when the locking component (32) is in a release position, the elastic connecting walls (323) is outwardly deformable to allow the connecting head (300) to be removed from the sunken cavity (322); when the locking component (32) is in a locking position, the elastic connecting wall (323) is capable of being slightly expanded and deformed outward but insufficient to enable the connecting head (300) to be removed from the sunken cavity (322), so the elastic connecting walls (323) are restricted from deforming outwards to keep the connecting head (300) in the sunken cavity (322) and in the locking position the connecting head (300) is movably arranged in the connecting seat to allow the connecting seat to be displaced relative to connecting rod (30) in all directions which is detectable by a collision detection component;
wherein, the connecting head (300) is spherical, and the sunken cavity (322) is a spherical cavity, the plurality elastic connecting (323) walls is in a surface contact with the connecting head (300);
wherein the connecting seat is fixed on the upper cover, the locking component is exposed from the upper cover, and the connecting rod (30) is fixed on the body;
wherein, the connecting seat comprises a bottom plate (33), the bottom plate (33) is provided with a protruding column (331) and an adjustment cavity (333), the adjustment cavity (333) is defined in the protruding column (331), an external thread (332) coupled with the internal thread (321) is arranged on an outer surface of the protruding column (331), the external thread (332) of the protruding column extends into the annular cavity (320) and is connected with the internal thread (321) of the column (324), so that the locking component (32) moves up and down relative to the bottom plate (33) when the locking component (32) rotates;
wherein, there is a gap between an inner wall surface of the adjustment cavity (333) and an outside surface of the elastic connecting wall (323) which allows the elastic connecting walls (323) to deform outwards so as to enable the connecting head (300) to be separated from the sunken cavity (322).

13. The robotic tool according to claim 12, wherein the robotic tool is a robotic mower.

* * * * *